(12) United States Patent
Melrose et al.

(10) Patent No.: US 6,977,792 B1
(45) Date of Patent: Dec. 20, 2005

(54) METHOD AND APPARATUS FOR RUNOUT CORRECTION BY PROPER POSITIONING OF SERVO DATA WHILE SELF-SERVO WRITING

(75) Inventors: Thomas O. Melrose, Longmont, CO (US); James W. Hargarten, Lafayette, CO (US); Bruce A. Liikanen, Berthoud, CO (US)

(73) Assignee: Maxtor Corporation, Longmont, CO (US)

( * ) Notice: Subject to any disclaimer, the term of this patent is extended or adjusted under 35 U.S.C. 154(b) by 124 days.

(21) Appl. No.: 10/618,439

(22) Filed: Jul. 10, 2003

Related U.S. Application Data (60) Provisional application No. 60/394,850, filed on Jul. 10, 2002.

(51) Int. Cl.[7] ............................................. G11B 5/596
(52) U.S. Cl. .................................... 360/75; 360/77.04
(58) Field of Search .............................. 360/75, 77.02, 360/77.04, 77.08

(56) References Cited

U.S. PATENT DOCUMENTS

| | | | |
|---|---|---|---|
| 6,115,203 A | 9/2000 | Ho et al. ................. | 360/77.04 |
| 6,519,107 B1 * | 2/2003 | Ehrlich et al. ................. | 360/75 |
| 6,549,362 B1 | 4/2003 | Melrose et al. ........... | 360/77.04 |
| 6,714,376 B1 * | 3/2004 | Brunnett et al. .............. | 360/75 |
| 6,751,046 B1 * | 6/2004 | Szita et al. .............. | 360/77.04 |
| 6,785,084 B2 * | 8/2004 | Szita ....................... | 360/77.04 |

OTHER PUBLICATIONS

Hargarten et al., "Method and Apparatus for Determining Embedded Runout Correction Values Using Feedback," U.S Appl. No. 10/318,316, filed Dec. 11, 2002.

Ehrlich et al., "Method and Apparatus for Providing Variable Gain Iterative Embedded Runout Correction in a Disk Drive," U.S. Appl. No. 10/410,576, filed Apr. 8, 2003.

* cited by examiner

Primary Examiner—David Hudspeth
Assistant Examiner—James L Habermehl (57) ABSTRACT

A method and system for self-writing track locations of a data disk in a disk drive in order to reduce overall track runout are disclosed. First set of servo bursts are self-written along a track via a transducer, and repeatable runout correction values for the first servo bursts are calculated. Then, second servo bursts are self-written along the track via the transducer such that the first and second servo bursts form a plurality of servo sector patterns that define the track centerline, wherein the second servo bursts are positioned using said correction values to essentially compensate for the runout in the first servo bursts and reduce the overall track runout.

25 Claims, 8 Drawing Sheets

METHOD AND APPARATUS FOR RUNOUT CORRECTION BY PROPER POSITIONING OF SERVO DATA WHILE SELF-SERVO WRITING

RELATED APPLICATION

Priority is claimed from U.S. Provisional Application No. 60/394,850, entitled "SSW Burst Position Correction", filed on Jul. 10, 2002, which is incorporated herein by reference.

FIELD OF THE INVENTION

The present invention relates to self-servo writing disk drives and more particularly to enhancement of runout correction by proper positioning of servo data while self-servo writing disk drives.

BACKGROUND OF THE INVENTION

Background for the present invention is provided herein in connection with a disk drive system. It should be noted, however, that the present invention is not intended to be limited to such systems.

A disk drive is a data storage device that stores digital data in tracks on the surface of a data storage disk. Data is read from or written to a track of the disk using a transducer that is held close to the track while the disk spins about its center at a substantially constant angular velocity. To properly locate the transducer near the desired track during a read or write operation, a closed-loop servo scheme is generally implemented that uses servo data read from the disk surface to align the transducer with the desired track.

The servo data includes servo patterns that typically comprise short servo bursts of a constant frequency signal, which are very precisely located and offset from either side of a data track's centerline. The bursts are written in a sector header area, and can be used to find the centerline of a track. Staying on center is required during both reading and writing. These servo-data areas allow a head to follow a track centerline around a disk, even when the track is out-of-round, as can occur with spindle wobble, disk slip and/or thermal expansion.

Servo bursts are conventionally written on a disk in the disk drive by a dedicated, external servo track writer (STW), which typically involves the use of large granite blocks to support the disk drive and to quiet outside vibration effects. However, servo track writers are expensive and require a clean room environment. As such, self-servo writing (SSW) methods for writing servo patterns with a disk drive's own transducers have been utilized.

Typically, in a SSW process, a temporary set of pre-existing reference servo information on a disk is used to control the transducer position while the final servo bursts are written to disk(s) in the disk drive. The SSW process involves a combination of three largely distinct sub-processes, including reading the temporary servo information to provide precise timing information, positioning a transducer at a sequence of radial positions using the variation in a read back signal amplitude as a sensitive position indicator, and writing the final servo burst patterns at the times and radial positions defined by the other two processes to form concentric circular tracks. An example SSW process is described in U.S. Pat. No. 5,907,447, by Yarmchuk, et al. Other SSW to processes are possible, such as servo propagation where the servo reader to writer offset is used to allow servoing on one set of servo bursts while writing another set of servo bursts.

In an ideal disk drive system, the tracks of the data disk are non-perturbed circles situated about the center of the disk. As such, each of these ideal tracks includes a track centerline that is located at a known constant radius from the disk center. In an actual system, however, it is difficult to write non-perturbed circular tracks to the data storage disk. That is, problems, such as vibration, bearing defects, etc. can result in tracks that are written differently from the ideal non-perturbed circular track shape. Positioning errors created by the perturbed nature of these tracks are known as written-in repetitive runout (SSW_RRO). The perturbed shape of these tracks complicates the transducer positioning function during read and write operations after the SSW process because the servo system needs to continuously reposition the transducer during track following to keep up with the constantly changing radius of the track centerline with respect to the center of the spinning disk. Furthermore, the perturbed shape of the these tracks can result in problems such as track squeeze and track misregistration errors during read and write operations.

In certain systems, as will be understood by those skilled in the art, after the servo patterns are written, an additional process is used to directly measure the SSW_RRO for each track of a disk so that compensation values are generated and written in servo fields on the disk. Thereafter, during read/write operations, that compensation information is used to position the transducer along an ideal track centerline. An example of such a process is described in U.S. Pat. No. 6,549,362 to Melrose et al. ('362 patent), which is incorporated herein by reference.

However, such a correction technique though effective, can be time consuming. First, the amount of SSW_RRO present on each track of a disk must be measured, and then a calculation is performed to determine correction factors to minimize the SSW_RRO in each track. Finally, the correction factors must be written to the disk in each servo field of each track. This process requires several revolutions to measure the SSW_RRO and then more revolutions to write the correction factors to the disk. In one example, such a process may require 12 or more revolutions to determine and write correction factors for each track.

There is, therefore, a need for a method and apparatus which improves embedded runout correction in a disk drive during the self-servo writing process and which also reduces the correction time required.

BRIEF SUMMARY OF THE INVENTION

The present invention addresses the above needs. In one embodiment, the present invention provides a method and system for reducing overall track runout while self writing track locations of a storage surface of a data disk of a disk drive. First, a set of servo bursts are self-written along a circular track via a transducer and repeatable runout error values for the first servo bursts are measured essentially instantaneously while the servo bursts are being written. A set of correction values are calculated for use in servoing, such that the transducer is caused to travel along a path that, on average, is equal but opposite to the path measured while the first set of servo bursts were being written.

Then, using the calculated set of correction values for positioning the transducer, a second set of servo bursts is self-written along the track via the transducer, such that the first and second servo bursts form a plurality of servo sector patterns that define the track centerline. The second servo bursts are positioned using said correction values to essentially compensate for the runout in the first servo bursts and to reduce the overall track runout. The second servo bursts are written using the correction values such that the average track centerline is adjusted to essentially compensate for the runout in the first servo bursts. Preferably, the correction values are obtained by circularly convolving the measured runout present during the writing of the first set of servo bursts with the inverse impulse response of the servo system.

In another example of the present invention, each servo sector pattern includes a trimmed burst pattern. As such, the step of writing the first servo bursts in each servo sector pattern further includes the steps of writing two servo bursts wherein one of the servo bursts trims the other servo burst, defining a first seam. Further, the step of calculating the repeatable runout correction values further includes the steps of measuring the repeatable runout (RRO) values based on differences between the intended positions of the first seams and the actual position of the transducer while the first seams are written, wherein said differences represent misplacements of the first seams. Then, correction values are obtained by convolving said measured RRO of the first seams with the inverse impulse response of the servo system to generate correction values for positioning the transducer while writing the second set of servo bursts (i.e., second seams). Then, the step of writing the second servo bursts in each servo sector pattern further includes the steps of writing two servo bursts wherein one of the servo bursts trims the other servo burst, defining a second seam, such that the second seams are positioned using said correction values to essentially compensate for misplacement of the first seams, thereby reducing the overall track runout.

According to another example of the present invention, the steps of writing the first servo bursts includes the additional steps of determining a position error due to repeatable runout at each of a plurality of points in the first servo burst pattern along the track addressed by the transducer head, and storing the position error. Further, the step of calculating the repeatable runout correction values for the first servo burst pattern further includes the steps of measuring a time domain impulse response of a disk drive servo control system associated with said transducer head, transforming said time domain impulse response into an error transfer function, taking the reciprocal of said error transfer function, transforming said reciprocal error transfer function into an inverse impulse response, and circularly convolving said inverse impulse response with said position error at each of a plurality of said points in the first servo pattern to obtain a runout correction value for each of said plurality of points. This process circularizes the track such that Non Repeatable Runout (NRO) error that perturbs the path of the head while the first set of servo bursts are being written is the only source of Repeatable Runout (RRO). Therefore, any PES (Position Error Signal) that exists when the track is being written is identical to the RRO being written-in.

In another aspect, the present invention provides a disk drive including a controller which implements the self-servo writing method of the present invention.

Other objects, features and advantages of the invention will be apparent from the following specification taken in conjunction with the following drawings.

DETAILED DESCRIPTION OF THE INVENTION

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Further, although in the description below, example embodiments of the present invention are described in connection with a disk drive system, it should be noted, however, that the present invention is not intended to be limited to such system.

Figure 1:
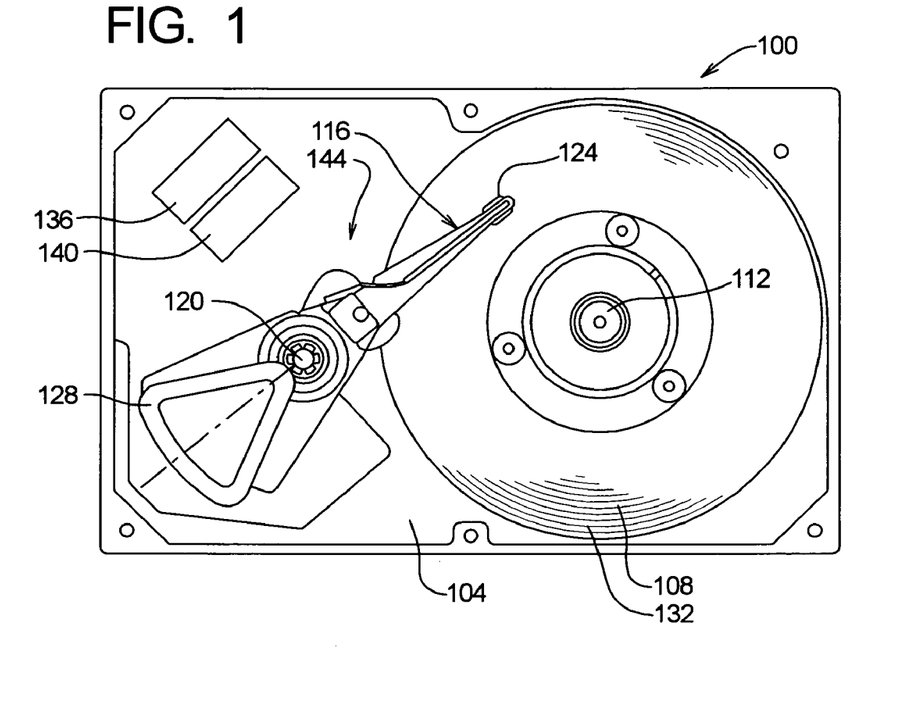
FIG. 1 is a diagrammatic representation of a top view of a hard disk drive, with the cover removed.

FIG. 1 illustrates a typical computer disk drive. The disk drive, generally identified by reference number 100, includes a base 104 and magnetic disks 108 (only one of which is shown in FIG. 1). The magnetic disks 108 are interconnected to the base 104 by a spindle motor (not shown) mounted within or beneath the hub 112, such that the disks 108 can be rotated relative to the base 104. Actuator arm assemblies 116 (only one of which is shown in FIG. 1) are interconnected to the base 104 by a bearing 120. The actuator arm assemblies 116 each include a transducer head 124 at a first end, to address each of the surfaces of the magnetic disks 108. A voice coil motor (VCM) 128 pivots the actuator arm assemblies 116 about the bearing 120 to radially position the transducer heads 124 with respect to the magnetic disks 108. By changing the radial position of the transducer heads 124 with respect to the magnetic disks 108, the transducer heads 124 can access different data tracks or cylinders 132 on the magnetic disks 108. The voice coil motor 128 is operated by a controller 136 that is in turn operatively connected to a host computer (not shown). A channel 140 processes information read from the magnetic disks 108 by the transducer heads 124.

Figure 2:
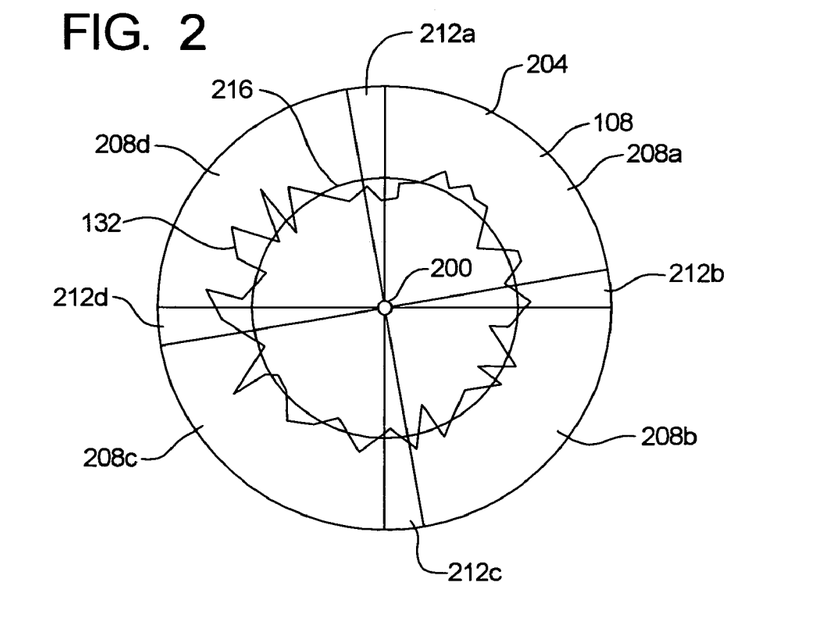
FIG. 2 is a diagrammatic representation of a magnetic storage disk having a self-servo written data track in accordance with the present invention.

As illustrated in FIG. 2, the disk 108 is substantially circular in shape and includes a center point 200 located in the center of the disk 108. The disk 108 also includes a plurality of tracks 132 (only one of which is illustrated in FIG. 2) on an upper surface 204 of the disk 108 for storing the digital data. The data tracks 132 are divided into data fields 208a–208d and servo sectors or hard sectors 212a–212d. Generally, the data fields 208a–208d are used for storing data as a series of magnetic transitions, while the servo sectors 212a–212d are used for storing servo information, also as a series of magnetic transitions/bursts, that is used to provide the transducer head 124 with positioning information. In particular, the servo sectors 212a–212d provide the transducer heads 124 with information concerning their position over the magnetic disk 108. More particularly, the servo sectors 212a–212d provide information to the transducer heads 124 concerning the identity of the track 132 and servo sector 212 over which each transducer head 124 is flying, and concerning the position of each transducer head with respect to the centerline of the track 132.

Although the magnetic disk 108 illustrated in FIG. 2 is illustrated as having a single data track 132 and four servo sectors 212, it can be appreciated that a typical computer disk drive contains a very large number of data tracks 132 and servo sectors 212. For example, computer disk drives having over 100,000 tracks per inch and 240 sectors are presently available.

Referring to both FIGS. 1 and 2, the disk drive 100 includes a servo control system 144 for controlling the position of a transducer head 124 with respect to a track 132 being followed. In general, the servo control system comprises the transducer head 124 being positioned, which reads the position information from the servo sectors 212; the actuator arm assembly 116 that is carrying the transducer head 124; the voice coil motor 128; the channel 140; and the controller 136. As described in the '362 patent, the response of the servo control system 144 to a given input is given by the error transfer function of the servo control system 144.

The track 132 is ideally non-perturbed and ideally shares a common center 200 with the disk 108, such as ideal track 216 illustrated in FIG. 2. Due to system imperfections, however, the actual written track 132 can be perturbed as compared to an ideal track 216 such as non-ideal track 132 as illustrated in FIG. 2. A perturbed or non-ideal track 132 is difficult for a transducer head 124 to follow, because the position of the transducer head 124 must constantly be adjusted by the servo control system. Consequently, the positioning of the transducer head 124 is not as accurate on the written track 132 as it would be on an ideal track 216.

The perturbations in the written track 132 due to positioning errors can be reduced by an enhanced servo writing process according to the present invention. In one embodiment, the present invention provides a method and system that allows self-writing of servo information (e.g., servo bursts) in tracks 132 that more closely resemble the ideal track 216 by reducing said position errors (SSW_RRO). As such, thereafter a transducer head 124 servoing on a track 132 can more closely follow the path of an ideal track, such as the path of track 216, using the self-written servo information.

As mentioned above, the tracks 132 on the disk 108 are each divided into a plurality of data fields 208 and servo sectors or hard sectors 212. The servo sectors 212 include, among other things, information for use by the disk drive 100 in locating a transducer head 124 above a desired track 132 of the disk 108. When a host computer requests that data be read from or written to a particular track 132 and data field 208 of the disk 108, the transducer head 124 must be moved to the track 132 and then must be positioned at a predetermined location relative to the centerline of the track 132 before data transfer can take place. For purposes of illustrating the present invention, it will be assumed that the transducer should be placed on the track centerline in order to read from and write to the disk. It should be understood that the invention is not limited to solely reading and writing when the transducer is placed at the track centerline. As noted above, the track 132 is written to the disk 108 in a SSW process according to the present invention, such that SSW_RRO is reduced.

Figure 3:
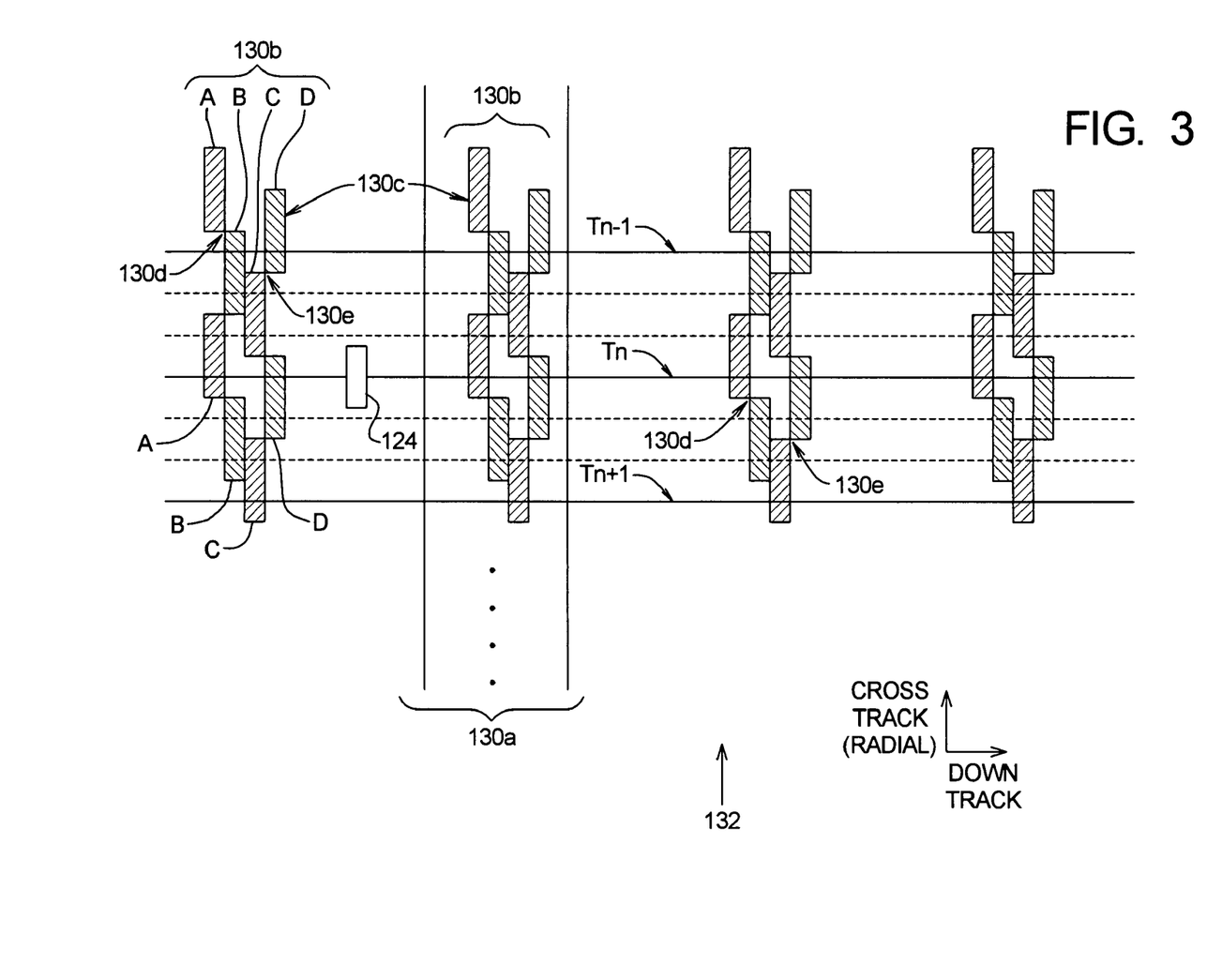
FIG. 3 is a diagrammatic representation of a servo burst pattern that may be used to position a transducer head with respect to a track centerline.

FIG. 3 illustrates typical servo hard sectors 130a stored within the servo portion of a servo sector 212 for use in centering a transducer head 124 on a desired track 132. In this example, a servo hard sector 130a includes sets 130b of staggered servo bursts 130c, which are designated as bursts A, B, C and D. The servo bursts 130c define the centerlines Tn−1, Tn and Tn+1 of the tracks 132 of the disk 108. In FIG. 3, the tracks 132 are diagrammatically laid out linearly in a down-track direction from left to right, and in a cross-track direction from top to bottom, of the page. Three example centerlines Tn−1, Tn and Tn+1 of three tracks 132 are defined by the servo bursts 130c on each track. The servo bursts 130c provide analog information to the servo system for transducer/head positioning. A different number of servo bursts and offset configurations are also possible. In the example herein, the A, B bursts form a burst pair and the C, D bursts form another burst pair. During normal disk drive operations, all of the four bursts A, B, C and D are used by the servo system when the transducer 124 is positioned at a write track centerline.

An example SSW process, according to the present invention for writing a servo track 132 that more closely resembles the ideal track 216, is now generally described. A temporary reference pattern of servo information (not shown) is initially provided on the disk 108 and is used by the servo system to determine a position error signal (PES) for positioning the transducer 124 to write the servo bursts. Further, the example SSW process is described in conjunction with a "trimmed" servo burst system. As used herein, a trimmed servo burst is one in which a radial edge of the burst is DC erased during a subsequent pass of the write element at a displaced radial position relative to the disk. A burst is trimmed to have e.g. a lower radial edge to be in alignment with the upper radial edge of an adjacent burst. It is possible to trim a previously written burst during a single pass of the transducer write head along a servo-writing path for writing another burst. A discussion of trimmed and untrimmed bursts is provided in U.S. Pat. No. 6,519,107 to Ehrlich, et al., incorporated herein by reference.

The method for self writing servo bursts includes the steps of self-writing first servo bursts along a track via a transducer, calculating repeatable runout correction values for the first servo bursts, and self-writing second servo bursts along the track via the transducer such that the first and second servo bursts form a plurality of servo sector patterns that define the track centerline, wherein the second servo bursts are positioned using said correction values to essentially compensate for the runout in the first servo bursts and reduce the overall track runout.

As such, in one example, in self-writing a track 132, the transducer 124 is positioned to write the bursts A ("A bursts") along a circular path during a revolution of the disk 108. Then, in another revolution the transducer 124 is moved a portion of the track width (e.g. ⅔ of track width) to write the bursts B ("B bursts"), wherein the B bursts trim off bottom edges of the A bursts, thereby defining a first burst seam (transition) 130d. The positioning errors in the seams 130d, which are measured while the servo system is self-writing the B bursts, are the offset values which are then stored in memory. Then, in another revolution, the bursts C ("C bursts") are written. Finally, in another revolution, the stored offset values are used to calculate correction values in writing the bursts D ("D bursts"). The D bursts are positioned to trim the C bursts and generate seams 130e that compensate for the positioning errors in the seams 130d.

The observed position of the seam 130d is controlled by the position of the transducer 124 during the trimming operation. As such, if burst B is being trimmed by burst A, then the position of the seam 130d is controlled by the position of the transducer 124 while writing burst A. Conversely, if burst A is trimmed by burst B then the position of the seam 130d is controlled by the position of the transducer 124 while writing burst B. The same holds for the bursts C and D.

Other sequences for writing and trimming the bursts 130c are possible, as described in greater detail further below. As such, in another example, the bursts D are written first in a disk revolution, then the bursts B are written in another disk revolution, then the bursts C are written in another disk revolution such that the bursts C trim the bursts D creating the seams 130e, and then in another disk revolution the bursts A are written such that the bursts A trim the bursts B, creating the seams 130d. The motion of the head 14 defines where the seam 130e between the bursts C and D occurs. As there is head motion due to disturbances that cause non-repeatable run out disturbances (NRO), the difference between the intended position of the seam 130e and the actual position of the seam 130e due to such head movement, is a capture of the NRO, and is recorded in the burst pair pattern C, D by mis-positioning of the seam 130e (SSW_RRO). According to an embodiment of the present invention, to correct that SSW_RRO in the seam 130e, the transducer 124 is positioned such that bursts A trim bursts B wherein the seams 130d for the A, B bursts are positioned (laid down) to compensate for the mis-positioning of the seam 130e. For example, if the seam 130e is too far off towards the outer diameter (OD) of the disk 108, then the seam 130d are positioned further towards the inner diameter (ID) of the disk 108 by an offset value to compensate for the mis-positioning of the seam 130e (SSW_RRO).

After the final servo bursts are written by the SSW, in normal disk drive operations, the servo system senses the position of the seams 130d between the bursts A and B, and the seams 130e between the bursts C and D, for track following. At each read/write position, one seam 130d and one seam 130e is used, wherein the servo system averages the observed position of the seams 130d, 130e to generate a position error signal (PES) to control the VCM 128 for properly positioning the transducer 124 over the tracks 132. Therefore, if during the SSW process, a seam 130e were mis-positioned slightly towards the ID of its intended (ideal) position, then according to the present invention, the seam 130d is intentionally mis-positioned (offset from ideal) by an equal amount toward the OD. As a result, the transducer head 124 is made to follow the path of an ideal track 216 by averaging the PES signal due to the seams 130d, 130e in each of the servo sectors 212 of a particular track 132.

To determine the non-repeatable run out (SSW_RRO) values of the seams 130e, in one implementation, the SSW_RRO in the seams 130e is determined based on the instantaneous PES at the time the seams 130e are created (e.g., when writing the C bursts that trim the D bursts). That instantaneous PES is determined using said pre-existing temporary servo information used for head positioning during the SSW process. The PES is used to compensate for the SSW_RRO while laying out the seams 130d, as described further below.

In one example, the instantaneous PES corresponding to the seams 130e, as detected during a disk revolution, is circularly convolved with the inverse impulse response of the disk drive servo system to determine the correction offset for adjusting the centerline of the 132 track when laying down the seams 130d, such that the position of the seams 130d cancel out the SSW_RRO written into the seams 130e. Because the PES of the track is due to the RMS sum of the two seams (e.g., 130e and 130d), and because the effect of NRO recorded in the seams 130e is effectively reduced by the positioning of the seams 130e, the method of the present invention reduces the total track SSW_RRO (e.g., by about 25%).

An example implementation of the above SSW process is now described in more detail. In a preferred implementation of the SSW process, an iterative process such as described in the '362 patent is applied to the temporary servo information that is used for servoing while writing the final servo bursts A, B, C and D. This reduces the RRO that may have been written into the temporary servo information itself. The temporary servo information, with reduced RRO, is then used for writing the servo bursts. However, as mentioned, in writing the servo bursts that define the seams 130e, NRO is recorded as SSW_RRO as mis-positioned seams 130e. Without compensation, the mis-positioned seams 130e perturb the track 132. The instantaneous PES from the temporary servo information when laying down the seams 130e indicates how far the seams 130e are mis-positioned from their ideal/intended position. The instantaneous PES (PES_RRO) is obtained from the temporary servo information, the instant the C bursts trim the D bursts to lay down the seams 130e, and are stored in memory.

Of importance is where the burst B is trimmed by the burst A, and not necessarily the position of the burst B. As such, the instantaneous PES (PES_RRO), while performing a burst write/trim operation that controls a seam position, indicates how far the first seams 130e were mis-positioned. The mis-positioning error (SSW_RRO) is calculated from the position error values (PES_RRO) and compensated for by intentionally mis-positioning the seams 130d on the other burst pair, in an equal and opposite manner relative to the ideal position of the first seams 130d.

To calculate the SSW_RRO values from the measured position error values (PES_RRO), the impulse response of the servo system is used. Then, correction/offset values are calculated to compensate for mis-positioning of the first seams (e.g., seams 130e). The correction values are used to create a control signal for the VCM 128 to position the transducer 124 when laying down the second seams (e.g., seams 130d) to compensate for the mis-positioning of the first seams (e.g., seams 130e). Therefore, in the above example, when writing the bursts A that trim the bursts B, the average track centerline is displaced by the correction/offset values to compensate for the NRO that was recorded (SSW_RRO) when the bursts C trimmed the bursts D, thereby reducing the overall track runout.

Figure 4:
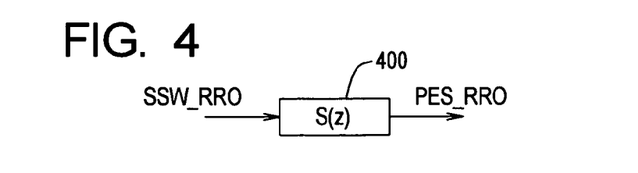
FIG. 4 is a block diagram depicting the relationship between repetitive runout and the position error signal for a particular track.
Figure 5:
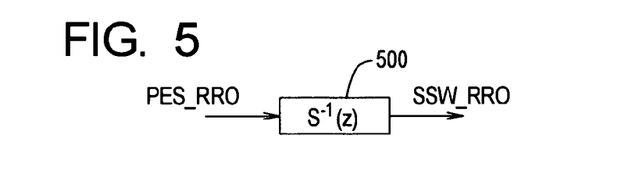
FIG. 5 is a block diagram depicting the relationship between the position error signal for a particular track and the repetitive runout.

The instantaneous PES values due to repeatable runout in the first seams 130e (i.e., PES_RRO values) are related to the SSW_RRO values by a predetermined transfer function S(z) 400, as illustrated in FIG. 4. The transfer function 400, in general, describes how the servo control system 144 reacts to and follows the track 132. That is, SSW_RRO is the stimulus and PES_RRO is the response. As illustrated in FIG. 5, in order to determine the SSW_RRO values using the measured PES_RRO values, one needs to find the inverse transfer function $S^{-1}(z)$ 500 and to apply the PES_RRO values thereto.

An example process of obtaining the impulse response and the inverse impulse response is in the '362 patent, and as such is only briefly described herein. The inverse impulse can be determined by measuring (in the time domain) the response of the servo control system associated with a transducer head to an impulse signal or function written to a track on the disk or otherwise provided to the servo control system. The error transfer function may then be obtained by transforming the measured impulse response to the frequency domain. The transformation of the impulse response of the transducer head is performed using a Discrete Fourier Transform. The reciprocal of the resulting error transfer function may then be taken. The reciprocal error transfer function response may then be transformed back into the time domain to obtain the inverse impulse response of the servo system for the transducer head. The transformation to the time domain is accomplished by using an inverse Discrete Fourier Transform. The runout correction values for the first seams are then calculated by circularly convolving the corresponding position error (PES_RRO) due to repeatable runout with the inverse impulse response for the transducer head. An inverse impulse response of a transducer head can be obtained by introducing an impulse to the transducer head from a track located towards an outer diameter of the disk surface addressed by the transducer head. An inverse impulse response can also be determined for each transducer head in the hard disk drive.

Figure 6:
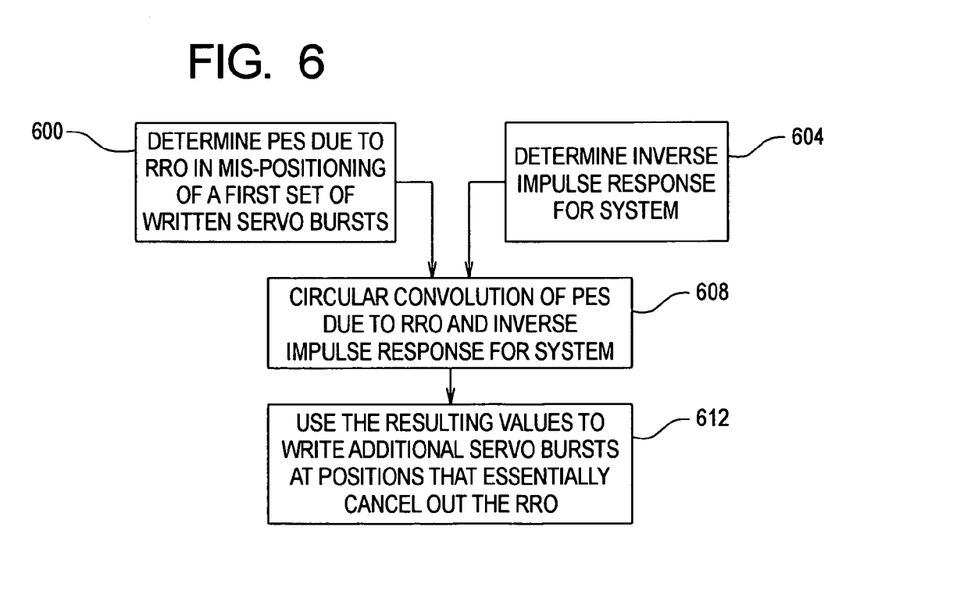
FIG. 6 is a flow chart illustrating a method for determining embedded runout correction values in accordance with an embodiment of the present invention.

FIG. 6 illustrates the steps of correcting SSW_RRO in a self-servo writing process in accordance with an embodiment of the present invention. At step 600, the instantaneous position error signal due to repeatable runout in the first seams (PES_RRO) is determined. In general, the position error due to repeatable runout (PES_RRO) is derived by reading the temporary servo information when the first seams (e.g., seams 130*e*) are laid down for a track 132, and then generating a position error signal therefrom. The process of obtaining position error signal/data from the temporary servo information is known by those skilled in the art, and as such not described herein. Preferably, the position error data is obtained from the temporary servo information, wherein the RRO that may have been recorded in the temporary servo information is reduced by known methods.

At step 604, the inverse impulse response for the servo system is determined. An example method for determining the inverse impulse response of the system is discussed in the '362 patent. Once the inverse impulse response for the system is determined, a circular convolution of the PES_RRO and the inverse impulse response for the system is performed at step 608. The result of the convolution operation are the SSW_RRO values (see FIG. 5). The SSW_RRO values obtained for the first seams 130*e* are used to calculate correction/offset values that are then utilized in controlling the VCM 128 in positioning the transducer 124 when laying down the second seams (e.g., seams 130*d*). As described, this process compensates for the mis-positioning of the first seams (e.g., seams 130*e*) and reduces the track runout (step 612).

Figure 7A:
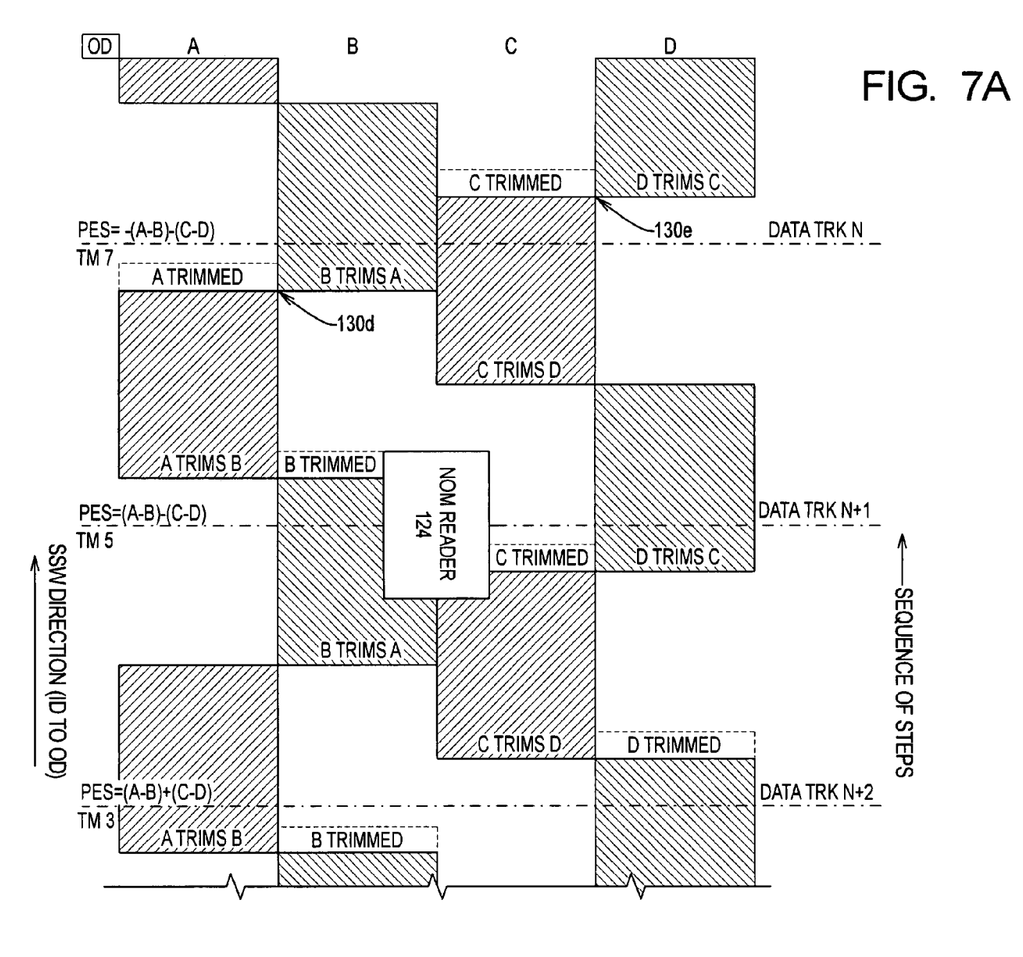
FIGS. 7A and 7B comprise a diagrammatic representation of a servo burst pattern written by an example self-servo writing process according to the present invention.
Figure 7B:
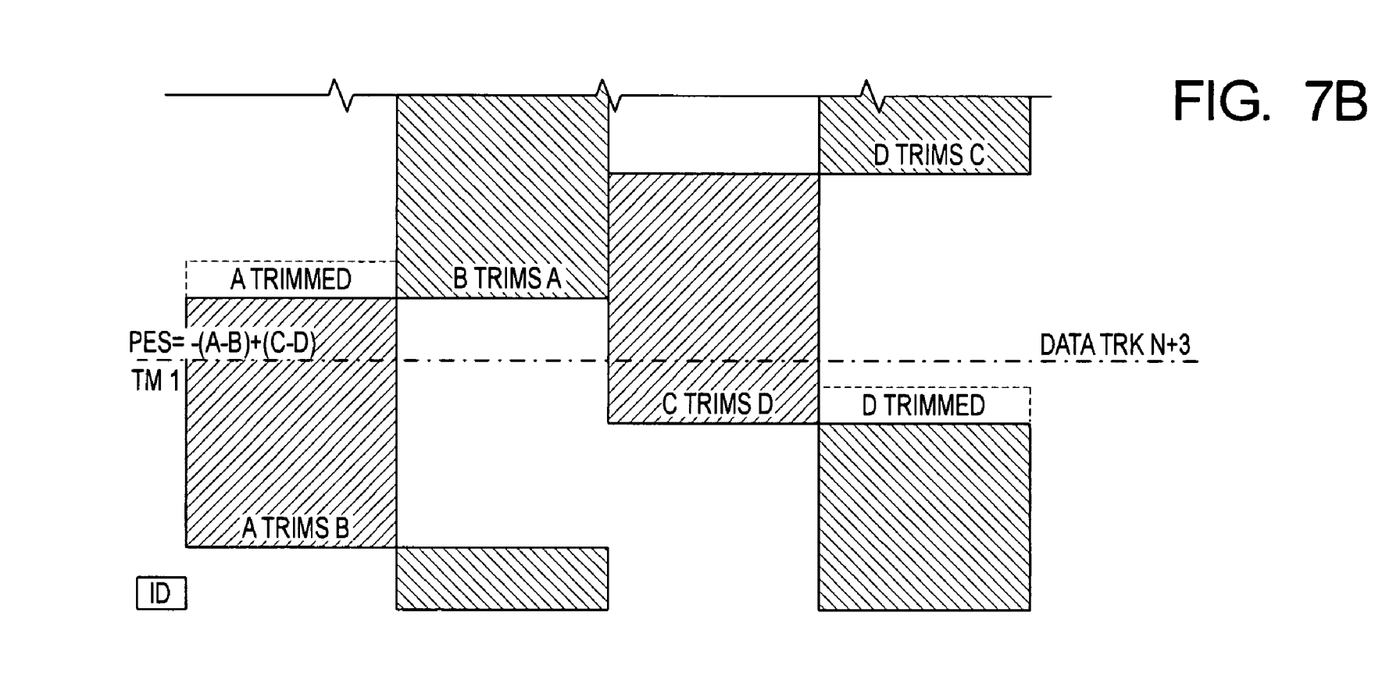

FIGS. 7A and 7B comprise a diagrammatic representation of an example self-servo writing (SSW) process according to the present invention. Four tracks 132, designated as tracks N, N+1, N+2 and N+3, are shown. Tracks N+1 and N+3 are shown with no SSW position error (SSW_RRO), and tracks N and N+2 are shown with SSW positioning error (in opposite radial directions). The 'inconsequential bursts' serve to isolate adjacent tracks and prevent any correction accumulation.

In writing the servo bursts for track N using track mode TM7, first, all the A bursts are written in a revolution. Then, in another revolution all the C bursts for the track N are written. Then, in another revolution the B bursts are written wherein each B burst trims the bottom edge of a corresponding A burst (represented as a dashed box, designated "A trimmed"). As each A burst is trimmed, the instantaneous PES (PES_RRO) at that location is stored in memory, wherein the instantaneous PES information indicates the position of the A, B seam 130*d*. The recorded PES_RRO values are then used to determine correction/offset values that are used in another revolution for writing the D bursts at positions that trim the C bursts, such that the position of C, D seams 130*e* compensate for mis-positioning of the corresponding A, B seams 130*d*. The D bursts are written wherein each D burst trims the edge of a corresponding C burst (represented as a dashed box, designated "C trimmed"), creating the C, D seams 130*e*.

Figure 8:
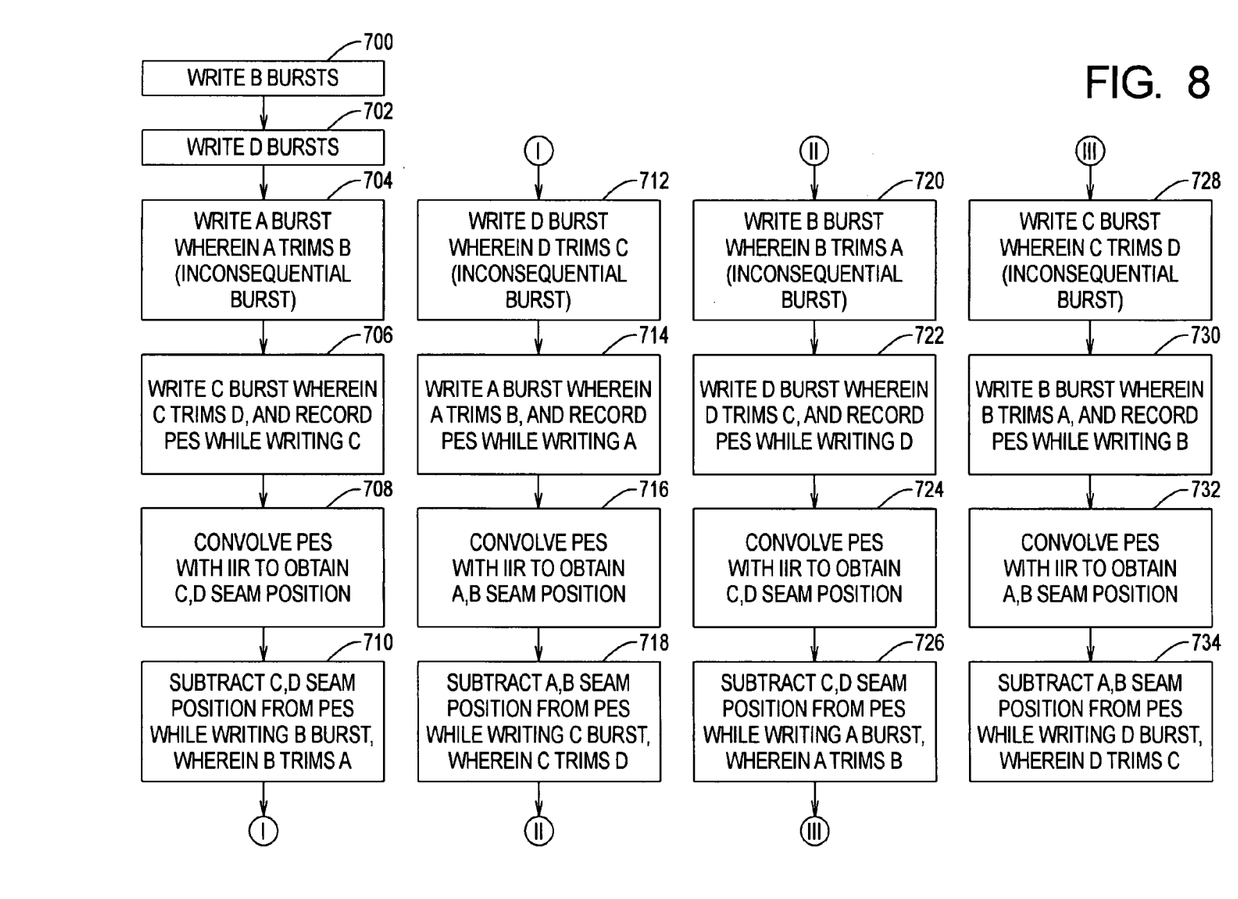
FIG. 8 is a flowchart of the steps of another example self-servo writing (SSW) process according to another embodiment of the present invention.
Figure 9A:
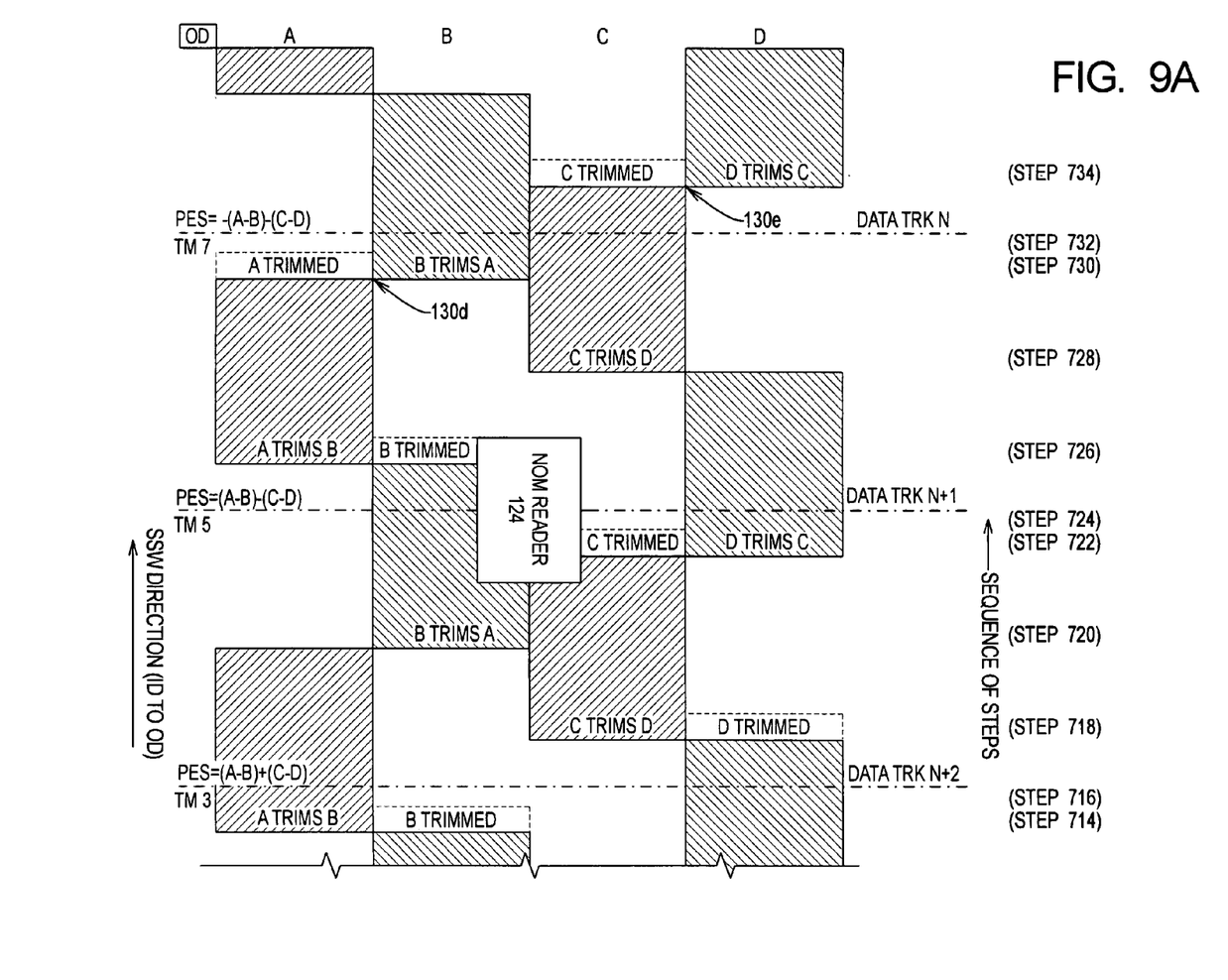
FIGS. 9A and 9B comprise a diagrammatic representation of a servo burst pattern written according to the self-servo writing steps in FIG. 8.
Figure 9B:
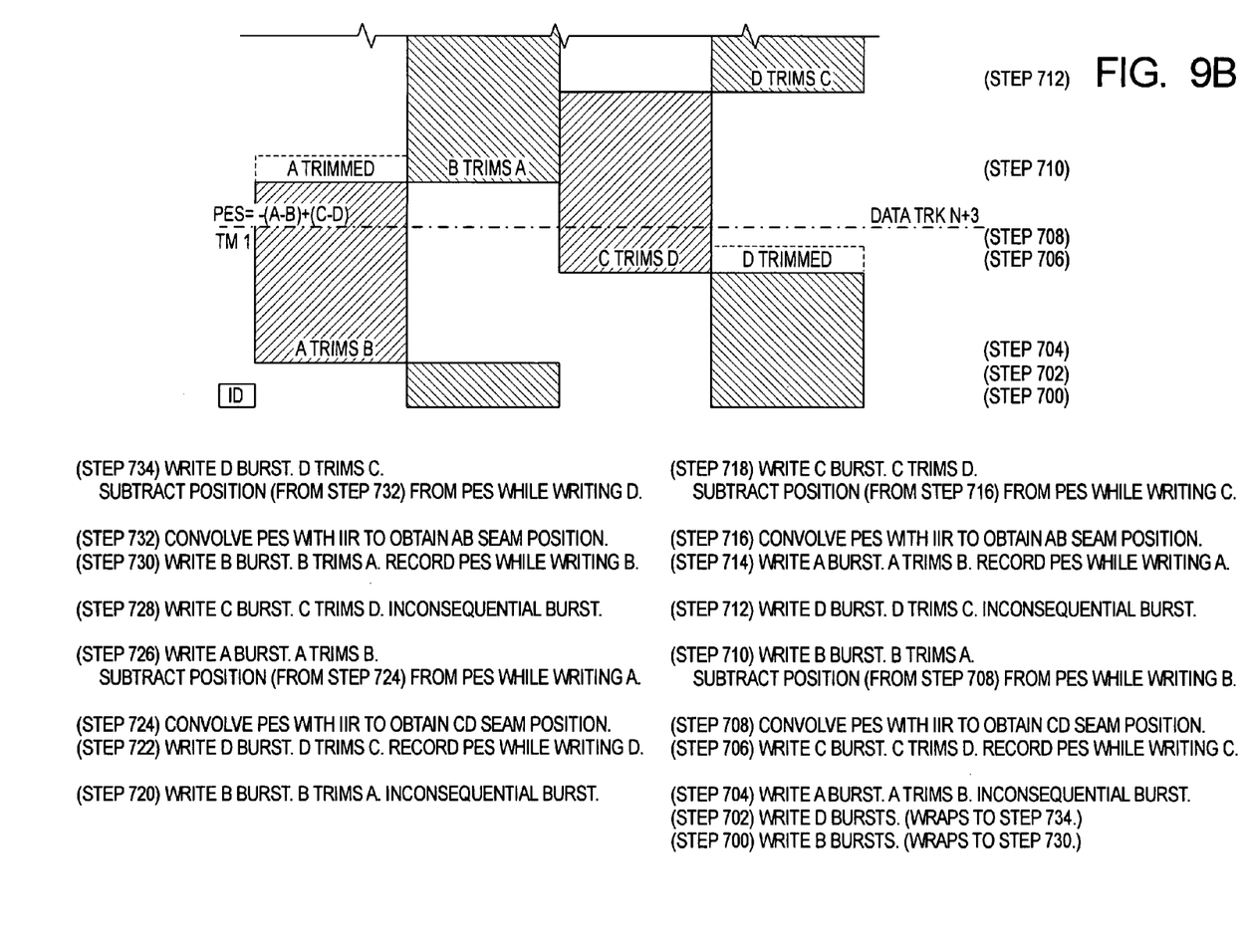

FIG. 8 shows a more detailed flowchart of the steps of another example self-servo writing (SSW) process, according to the present invention. FIGS. 9A and 9B comprise a diagrammatic example of a method of self-writing servo burst patterns using steps such as those shown in FIG. 8. For simplicity, the steps in FIG. 8 are also shown in FIGS. 9A and 9B, from bottom to top in sequence, and each step is aligned with the respective burst writing/trimming operation. The SSW process is described for four tracks 132, designated as tracks N, N+1, N+2 and N+3 in FIGS. 9A and 9B. Tracks N+1 and N+3 are shown with no SSW position error (SSW_RRO), and tracks N and N+2 are shown with SSW positioning error (in opposite radial directions). The 'inconsequential bursts' serve to isolate adjacent tracks and prevent any correction accumulation.

In FIGS. 9A and 9B, the servo bursts A, B, C and D define the tracks N, N+1, N+2 and N+3 as shown, and correspond to different track "modes" (e.g., TM1, TM3, TM5 and TM7). Each track mode indicates the sequence in which the bursts are written/trimmed, and the corresponding PES is based on combinations of the burst difference values corresponding to the track mode. For example, track mode TM1 corresponds to the burst combination PES=−(A-B)+(C-D), the track mode TM3 corresponds to the burst combination PES=(A-B)+(C-D), the track mode TM5 corresponds to the burst combination PES=(A-B)−(C-D), and the track mode TM7 corresponds to the burst combination PES=−(A-B)−(C-D). Other track modes TM0, TM2, TM4, TM6 are used for two burst tracks (i.e., A and B bursts).

In this example, writing the 4-burst pattern herein is performed in eight steps which represent the four different track modes. The process starts at a track mode (e.g., TM1), and cycles through the track modes depending on the steps in the eight-step process, as shown by the example in FIGS. 9A and 9B and described hereinbelow. As those skilled in the art will appreciate, the present invention is applicable to other burst patterns and other burst numbers (e.g., 6 burst system) by taking into account the burst relationships and how the bursts trim one another. The present invention is also applicable to other servo writing methods such as servo writing by multiple trims of one or more servo bursts.

As an overview, referring to FIGS. 9A and 9B, in writing the servo bursts for track N using track mode TM7, first all the A bursts are written in a revolution. Then, in another revolution all the C bursts for the track N are written. Then, in another revolution the B bursts are written wherein each B burst trims the bottom edge of a corresponding A burst (represented as a dashed box, designated "A trimmed"). As each A burst is trimmed, the instantaneous PES (PES_RRO) at that location is stored in memory, wherein the instantaneous PES information indicates the position of the A, B seam 130*d*. The recorded PES_RRO values are then used to determine correction/offset values that are used in another revolution for writing the D bursts at positions that trim the C bursts, such that the position of C, D seams 130*e* compensate for mis-positioning of the corresponding A, B seams 130*d*. The D bursts are written wherein each D burst trims the edge of a corresponding C burst (represented as a dashed box, designated "C trimmed"), creating the C, D seams 130*e*.

Now referring to the steps in FIG. 8 in conjunction with the diagram in FIGS. 9A and 9B (starting from track N+3 at the bottom of FIG. 9B, and moving from the bottom to the top of FIG. 9A), the detailed steps for writing the servo bursts for the four tracks N, N+1, N+2 and N+3 are described, wherein:

1) The B bursts are written in a disk revolution (step 700);
2) Then D bursts are written in another disk revolution (step 702);
3) Then A bursts are written in another disk revolution, wherein each A burst trims a corresponding B bursts (inconsequential burst) (step 704);
4) Then C bursts are written in another disk revolution, wherein each C burst trims a corresponding D burst (creating C, D seams 130*e*), such that the instantaneous PES (PES_RRO) is stored in memory while writing each C burst (step 706); then, the just stored PES values (PES_RRO) are circularly convolved with the inverse impulse response (IIR) of the system to determine the corresponding C, D seam positions (offsets) (step 708);
5) Then B bursts are written in another disk revolution such that each B burst trims a corresponding A burst (creating A, B seams 130*d*), wherein when writing each B burst the corresponding C, D seam position (offset) calculated in step 708 is subtracted from the PES that controls the transducer position writing that B burst to compensate for SSW_RRO in C, D seam position (step 710);
6) Then D bursts are written in another disk revolution such that each D burst trims a C burst (inconsequential burst) (step 712);
7) Then A bursts are written in another disk revolution such that each A burst trims a B burst (creating A, B seams 130*d*), wherein the instantaneous PES (PES_RRO) is stored in memory while writing each A burst (step 714); then, the just stored PES values (PES_RRO) are circularly convolved with the inverse impulse response (IIR) of the system to determine the corresponding A, B seam positions (offsets) (step 716);
8) Then C bursts are written in another disk revolution such that each C burst trims a corresponding D burst (creating C, D seams 130*e*), wherein when writing each C burst, the corresponding A, B seam position (offset) calculated in step 716 is subtracted from the PES that controls the transducer position writing that C burst, to compensate for SSW_RRO in A, B seam position (step 718);
9) Then B bursts are written in another disk revolution such that each B burst trims an A burst (inconsequential burst) (step 720);
10) Then D bursts are written in another disk revolution such that each D burst trims a corresponding C burst (creating C, D seams 130*e*), wherein the instantaneous PES (PES_RRO) is stored in memory while writing each D burst (step 722); then, the just stored PES values (PES_RRO) are circularly convolved with the inverse impulse response (IIR) of the system to determine the corresponding C, D seam positions (offsets) (step 724);
11) Then A bursts are written in another disk revolution such that each A burst trims a corresponding B burst (creating A, B seams 130*d*), wherein when writing each A burst, the corresponding C, D seam position (offset) calculated in step 724 is subtracted from the PES that controls the transducer position writing that A burst, to compensate for SSW_RRO in C, D seam position (step 726);
12) Then C bursts are written in another disk revolution such that each C burst trims a D burst (inconsequential burst) (step 728);
13) Then B bursts are written in another disk revolution such that each B burst trims a corresponding A burst (creating A, B seams 130*d*), wherein the instantaneous PES (PES_RRO) is stored in memory while writing each B burst (step 730); then, the just stored PES values (PES_RRO) are circularly convolved with the inverse impulse response (IIR) of the system to determine the corresponding A, B seam positions (offsets) (step 732);
14) Then D bursts are written in another disk revolution such that each D burst trims a corresponding C burst (creating C, D seams 130*e*), wherein when writing each D burst, the corresponding A, B seam position (offset) calculated in step 732 is subtracted from the PES that controls the transducer position writing that D burst, to compensate for SSW_RRO in A, B seam position (step 734); and so on.

As those skilled in the art will appreciate, implicit in the above steps is that the transducer 124 is moved under PES and timing control to write the various bursts at different radial locations. In one example, the head 124 is wide enough such that it can be positioned to "see" at least a portion of two or more bursts at the same time.

After the SSW process, during normal operation of the disk drive 100, the transducer head 124 reads the servo bursts in each servo sector 212 of a desired track 132. If the head 124 is placed at the seam 130*d* between bursts A and B, the head readback signal includes half the signal value of burst A and half the signal value of burst B. If the head 124 is shifted off towards burst A, magnitude of burst A increases and magnitude of burst B decreases. The same applies to burst pair C, D. The A, B and C, D bursts are shifted in position from each other by fractions of track width, such as e.g. ⅓ of track width in this example. For head positioning, in one example, the signal value from the flux transitions in the servo bursts induced to the transducer are used in a decoding process by demodulating the induced transducer signals to form difference values (difference signals) including A-B, and C-D phases. Transducer position tracking information is decoded by using combinations of the A-B burst phase and the C-D burst phase depending on the radial (cross track) location of the transducer relative to track centerline. As such, the difference signals can be used in combination to obtain said position error signal (PES) for transducer positioning by the servo system.

The PES indicates the distance between the center of the transducer head 124 and the centerline (e.g. centerline 320*b*) of the desired track. For a requested read/write operation, the PES signal is used by the disk drive 100 to change the position of the transducer head 124 to one that is closer to the desired (centered) position. This centering process is repeated for each successive sector on the track until the requested read/write operation has been performed in the appropriate data field 208 of the disk 108. It should be appreciated that other schemes for storing servo information on the magnetic media, such as schemes having said A, B position bursts; using zones; constant linear density (CLD)

recording, split data fields; and/or hybrid servo, can also be used in accordance with the present invention.

The present invention can be applied to any self-servo writing system where some temporary servo information is used for timing and transducer positioning to write final servo data patterns. This may include printed media, partial write systems and self-propagation servo write systems, and can be applied to systems using multi pass writes and trims, as those skilled in the art can appreciate. Because the temporary servo information will inherently have a certain amount of RRO in it, it is necessary to remove the RRO with some type of real-time Runout Correction system, in order to circularize the temporary servo information before using it to write the final servo bursts. The correction being used to cancel out the NRO is added to whatever correction is needed to circularize the temporary servo information.

As known to those skilled in the art, in addition to the logic blocks shown in the drawings, the various methods and architectures described herein can be implemented as: computer instructions for execution by a microprocessor, ASIC units, firmware, and logic circuits, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for self writing track locations of a storage surface of a data disk of a disk drive, comprising the steps of:
    (a) self-writing first servo bursts along a circular track via a transducer;
    (b) calculating repeatable runout correction values for the first servo bursts;
    (c) self-writing second servo bursts along the track via the transducer such that the first and second servo bursts form a plurality of servo sector patterns that define the track centerline, wherein the second servo bursts are positioned using said correction values to essentially compensate for the runout in the first servo bursts and reduce the overall track runout.

2. The method of claim 1, wherein in step (c) the second servo bursts are written using the correction values such that the average track centerline is adjusted to essentially compensate for the runout in the first servo bursts.

3. The method of claim 1, wherein each servo sector pattern includes a trimmed burst pattern.

4. The method of claim 3, wherein:
    the step of writing the first servo bursts in each servo sector pattern further includes the steps of writing two servo bursts wherein one of the servo bursts trims the other servo burst, defining a first seam;
    the step of calculating the repeatable runout correction values further includes the steps of calculating repeatable runout correction values based on differences between the intended positions of the first seams and the actual positions of the first seams as written, wherein said difference represent mis-placements of the first seams; and
    the step of writing the second servo bursts in each servo sector pattern further includes the steps of writing two servo bursts wherein one of the servo bursts trims the other servo burst, defining a second seam, such that the second seams are positioned using said correction values to essentially compensate for mis-placement of the first seams, thereby reducing the overall track runout.

5. The method of claim 4, wherein each servo sector pattern includes a trimmed burst pattern comprising four radially offset, circumferentially staggered, servo bursts.

6. The method of claim 1, wherein:
    the step of writing the first servo bursts includes the additional steps of determining a position error due to repeatable runout at each of a plurality of points in the first servo burst pattern along the track addressed by the transducer head, and storing the position error; and
    the step of calculating the repeatable runout correction values for the first servo burst pattern further includes the steps of:
        measuring a time domain impulse response of a disk drive servo control system associated with said transducer head;
        transforming said time domain impulse response into an error transfer function;
        taking the reciprocal of said error transfer function;
        transforming said reciprocal error transfer function into an inverse impulse response; and
        convolving said inverse impulse response with said position error at each of a plurality of said points in the first servo pattern to obtain a runout correction value for each of said plurality of points.

7. The method of claim 6, wherein the data disk includes a reference pattern for determining said position error for self-writing the servo patterns, the method further including the steps of generating the position error values based on the reference pattern.

8. The method of claim 7, wherein the step of generating the position error values based on the reference pattern further includes the steps of reducing any existing repeatable runout in the position error information that is obtained from the reference pattern to obtain enhanced position information, and using the enhanced position information as said position error values.

9. The method of claim 6, wherein said step of transforming said time domain impulse response into an error transfer function is performed using a Discrete Fourier Transform.

10. The method of claim 6, wherein said step of transforming said reciprocal error transfer function into an inverse impulse is performed using an inverse Discrete Fourier Transform.

11. A method for self writing track locations of a storage surface of a data disk of a disk drive, wherein the data disk includes a reference pattern for determining position information error for self-writing, the method comprising the steps of:
    generating position information based on the reference pattern;
    reducing any existing repeatable runout in the position information that is obtained from the reference pattern to obtain enhanced position information, and using the enhanced position information for self-writing servo bursts;
    self-writing first servo bursts along a circular track via a transducer and concurrently determining a position error due to repeatable runout at each of a plurality of points in the first servo burst pattern along the track addressed by the transducer head, and storing the position error; and
    calculating the repeatable runout correction values for the first servo burst pattern by:
        measuring a time domain impulse response of a disk drive servo control system associated with said transducer head;

transforming said time domain impulse response into an error transfer function;

taking the reciprocal of said error transfer function;

transforming said reciprocal error transfer function into an inverse impulse response; and convolving said inverse impulse response with said position error at each of a plurality of said points in the first servo pattern to obtain a runout correction value for each of said plurality of points; and self-writing second servo bursts along the track via the transducer such that the first and second servo bursts form a plurality of servo sector patterns that define the track centerline, wherein the second servo bursts are positioned using said correction values to essentially compensate for the runout in the first servo bursts and reduce the overall track runout.

12. The method of claim 11, wherein the second servo bursts are written using the correction values such that the average track centerline is adjusted to essentially compensate for the runout in the first servo bursts.

13. The method of claim 11, wherein each servo sector pattern includes a trimmed burst pattern.

14. The method of claim 13, wherein:

the step of writing the first servo bursts in each servo sector pattern further includes the steps of writing two servo bursts wherein one of the servo bursts trims the other servo burst, defining a first seam;

the step of calculating the repeatable runout correction values further includes the steps of calculating repeatable runout correction values based on differences between the intended positions of the first seams and the actual positions of the first seams as written, wherein said difference represent misplacements of the first seams; and the step of writing the second servo bursts in each servo sector pattern further includes the steps of writing two servo bursts wherein one of the servo bursts trims the other servo burst, defining a second seam, such that the second seams are positioned using said correction values to essentially compensate for mis-placement of the first seams, thereby reducing the overall track runout.

15. The method of claim 14, wherein each servo sector pattern includes a trimmed burst pattern comprising four radially offset, circumferentially staggered, servo bursts.

16. The method of claim 11, wherein said step of transforming said time domain impulse response into an error transfer function is performed using a Discrete Fourier Transform.

17. The method of claim 11, wherein said step of transforming said reciprocal error transfer function into an inverse impulse is performed using an inverse Discrete Fourier Transform.

18. A hard disk drive having servo burst position correction, comprising:

a base;

a data disk comprising a reference pattern for providing position information to self-write final servo patterns in a plurality of data tracks arranged concentrically about a spindle, wherein each of said data tracks is segmented into a plurality of data sectors by servo sectors, wherein said disks may be rotated at a constant velocity with respect to said base;

a transducer head for reading information from said data disk and for writing information to said data disk, wherein said transducer head is movable in a radial direction with respect to said disk to address a selected one of said plurality of data tracks;

a voice coil motor, interconnected to said transducer head, for moving said transducer head with respect to said data tracks;

a channel for receiving signals, including position error signals, derived from said disk by said transducer head; and a controller, interconnected to said voice coil motor, for controlling a position of said transducer head with respect to said reference pattern, wherein the controller writes final servo bursts on the data disk by self-writing first servo bursts along a circular track via the transducer, calculating repeatable runout correction values for the first servo bursts and self-writing second servo bursts along the track via the transducer such that the first and second servo bursts form a plurality of servo sector patterns that define the track centerline, wherein the second servo bursts are positioned using said correction values to essentially compensate for the runout in the first servo bursts and reduce the overall track runout.

19. The disk drive of claim 18, wherein the second servo bursts are written using the correction values such that the average track centerline is adjusted to essentially compensate for the runout in the first servo bursts.

20. The disk drive of claim 18, wherein each servo sector pattern includes a trimmed burst pattern.

21. The disk drive of claim 20, wherein:

the first servo bursts include two servo bursts wherein the controller causes the transducer to write one of the servo bursts to trim the other servo burst, defining a first seam;

the controller calculates the repeatable runout correction values based on differences between the intended positions of the first seams and the actual positions of the first seams as written, wherein said difference represent misplacements of the first seams and;

the second servo bursts include two servo bursts wherein the controller causes the transducer to write one of the servo bursts to trim the other servo burst, defining a second seam, such that the second seams are positioned using said correction values to essentially compensate for mis-placement of the first seams, thereby reducing the overall track runout.

22. The disk drive of claim 21, wherein each servo sector pattern includes a trimmed burst pattern comprising four radially offset, circumferentially staggered, servo bursts.

23. The disk drive of claim 18, wherein:

while writing the first servo bursts, the controller determines a position error due to repeatable runout at each of a plurality of points in the first servo burst pattern along the track addressed by the transducer head, and stores the position error; and the controller calculates the repeatable runout correction values for the first servo burst pattern by convolving an inverse impulse response of a disk drive servo system with said position error at each of a plurality of said points in the first servo pattern to obtain a runout correction value for each of said plurality of points, wherein the inverse impulse response is obtained by measuring a time domain impulse response of a disk drive servo control system associated with said transducer head, transforming said time domain impulse response into an error transfer function, taking the reciprocal of said error transfer function, and transforming said reciprocal error transfer function into an inverse impulse response.

24. The disk drive of claim 23, wherein transforming said time domain impulse response into an error transfer function is performed using a Discrete Fourier Transform.

25. The disk drive of claim 23, wherein said step of transforming said reciprocal error transfer function into an inverse impulse is performed using an inverse Discrete Fourier Transform.

* * * * *